(12) United States Patent
Uchida

(10) Patent No.: US 8,250,465 B2
(45) Date of Patent: Aug. 21, 2012

(54) ENCODING/DECODING APPARATUS, METHOD AND COMPUTER PROGRAM

(75) Inventor: Hitoshi Uchida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 644 days.

(21) Appl. No.: 12/524,665

(22) PCT Filed: Feb. 5, 2008

(86) PCT No.: PCT/JP2008/052214
§ 371 (c)(1),
(2), (4) Date: Jul. 27, 2009

(87) PCT Pub. No.: WO2008/099793
PCT Pub. Date: Aug. 21, 2008

(65) Prior Publication Data
US 2010/0107052 A1    Apr. 29, 2010

(30) Foreign Application Priority Data
Feb. 16, 2007   (JP) .................... 2007-036808

(51) Int. Cl.
G06F 17/00   (2006.01)
(52) U.S. Cl. ........ 715/234; 715/237; 707/601; 707/760; 341/79; 341/106
(58) Field of Classification Search .................. 715/234, 715/237; 707/601, 760; 341/79, 106
See application file for complete search history.

(56) References Cited

U.S. PATENT DOCUMENTS

| | | | |
|---|---|---|---|
| 7,043,686 B1 | 5/2006 | Maruyama et al. | 715/513 |
| 7,292,160 B1 * | 11/2007 | Wang et al. | 341/51 |
| 7,437,374 B2 * | 10/2008 | Chen et al. | 1/1 |
| 8,145,608 B2 * | 3/2012 | Kunti et al. | 707/694 |
| 8,149,148 B1 * | 4/2012 | Allen | 341/106 |
| 2004/0054692 A1 | 3/2004 | Seyrat et al. | 707/104.1 |
| 2004/0073870 A1 * | 4/2004 | Fuh et al. | 715/513 |
| 2005/0177543 A1 * | 8/2005 | Chen et al. | 707/1 |
| 2009/0037368 A1 * | 2/2009 | Petride et al. | 707/2 |

FOREIGN PATENT DOCUMENTS

JP   2001-217720 A   8/2001
(Continued)

OTHER PUBLICATIONS

"RELAX NG Specification," Committee Specification Dec. 3, 2001, OASIS 2001, pp. 1-38, J. Clark and M. Murata, editors, printed on May 11, 2009 from http://www.relaxng.org/spec-20011203.html.

(Continued)

Primary Examiner — Stephen Hong
Assistant Examiner — Matthew Ludwig
(74) Attorney, Agent, or Firm — Fitzpatrick, Cella, Harper & Scinto

(57) ABSTRACT

An information processing apparatus comprises a readout unit adapted to read out, from a storage unit, correspondence information that includes a document structure of a structured document and a first code for encoding the document structure; a verification unit adapted to verify whether grammar of a portion included in a structured document for processing is valid, based on the document structure included in the correspondence information; and an encoding unit adapted to encode the structured document using the first code, in relation to a portion whose grammar is verified as being valid by the verification unit.

11 Claims, 19 Drawing Sheets

```
<circle cx="200" cy="100" r="30" fill="none"
    stroke="black" stroke-width="5"/>
```
| 0x05 0x07 | START CODE OF CONTENT MODEL APPEARING REPEATEDLY

| 0x13 0x0a 0x0b 0x0c 0x0d 0x0e | CODES OF ATTRIBUTE VALUES OF circle ELEMENT

```
<text x="190" y="120" font-size="50">2</text>
```
| 0x14 0x10 0x11 0x15 | CODES OF ATTRIBUTE VALUES AND ELEMENT CONTENT OF text ELEMENT

| 0x06 | END CODE OF CONTENT MODEL APPEARING REPEATEDLY

FOREIGN PATENT DOCUMENTS

| | | |
|---|---|---|
| JP | 2004-530188 A | 9/2004 |
| JP | 2005-018672 A | 1/2005 |
| JP | 2005-215951 A | 8/2005 |

OTHER PUBLICATIONS

"RELAX NG Compact Syntax," Committee Specification Nov. 21, 2002, OASIS 2002, pp. 1-30, J. Clark, editor, printed on May 11, 2009 from http://www.oasis-open.org/committees/relax-ng/compact-20021121.html.

"XML Schema Part 2: Datatypes Second Edition," W3C Recommendation Oct. 28, 2004, P. Biron and A. Malhotra, editors, 2004, pp. 1-94, printed on Jun. 19, 2009 from http://www..w3.org/TR/2004/REC-xmlschema-2-20041028/datatypes.html.

A. Kobayashi et al., "An improved method of XML document encoding with uniformed sheet "XEUS"," IPSJ SIG Technical Report, 2005, pp. 25-30 (Japanese document with English abstract).

ISO/IEC 24824-1:2007, ISO Information Technology—Generic Applications of ASN.1: Fast Infoset, ISO, 2007, 2 pages, 2007, (http://www.iso.org/iso/en/CatalogueDetailPage), printed on May 11, 2009 from http://www.iso.org/iso/iso_catalogue/catalogue_tc/catalogue_detail.htm?csnumber=41327&scopelist=PROGAMME.

"MPEG Standards—Coded representation of video and audio," ISO, 1 page, printed on May 11, 2009 from http://www.iso.org/iso/prods-services/popstds/mpeg.html.

* cited by examiner

FIG. 1A

EXEMPLARY SVG IN WHICH THE SAME DOCUMENT STRUCTURE APPEARS REPEATEDLY

```
<svg xmlns="http://www.w3.org/2000/svg">
  <circle cx="100" cy="100" r="30" fill="none"
    stroke="black" stroke-width="5"/>
  <text x="90" y="120" font-size="50">1</text>           BUTTON  — 9101

<circle cx="200" cy="100" r="30" fill="none"
    stroke="black" stroke-width="5"/>
  <text x="190" y="120" font-size="50">2</text>          BUTTON  — 9102

<circle cx="300" cy="100" r="30" fill="none"
    stroke="black" stroke-width="5"/>
  <text x="290" y="120" font-size="50">3</text>          BUTTON  — 9103
</svg>
```

FIG. 1B

SVG DISPLAY IMAGE 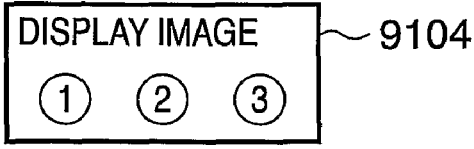

FIG. 2

EXEMPLARY ENCODING TABLE

| CODE | VOCABULARY |
|---|---|
| 0x00 | START TAG |
| 0x01 | END TAG |
| 0x02 | ATTRIBUTE |
| 0x03 | ELEMENT CONTENT |
| 0x04 | NAMESPACE URI |
| 0x05 | svg |
| 0x06 | xmlns="http://www.w3.org/2000/svg" |
| 0x07 | circle |
| 0x08 | cx |
| 0x09 | 100 |
| 0x0a | cy |
| 0x0b | r |
| 0x0c | 30 |
| 0x0d | fill |
| 0x0e | none |
| 0x0f | stroke |
| 0x10 | black |
| 0x11 | stroke-width |
| 0x12 | 5 |

| CODE | VOCABULARY |
|---|---|
| 0x13 | text |
| 0x14 | x |
| 0x15 | 90 |
| 0x16 | y |
| 0x17 | 120 |
| 0x18 | font-size |
| 0x19 | 50 |
| 0x1a | 1 |
| 0x1b | 200 |
| 0x1c | 190 |
| 0x1d | 2 |
| 0x1e | 290 |
| 0x1f | 3 |

FIG. 7

EXEMPLARY SCHEMA OF BUTTON OBJECT

```
<define name="button">
<element name="circle"> ~703
    <attribute name="cx">         ⎫
        <data type="double"/>     ⎬ 705
    </attribute>                  ⎭
    <attribute name="cy">         ⎫
        <data type="double"/>     ⎬ 706
    </attribute>                  ⎭
    <attribute name="r">          ⎫
        <data type="double"/>     ⎬ 707
    </attribute>                  ⎭
    <attribute name="fill">       ⎫
        <data type="string"/>     ⎬ 709
    </attribute>                  ⎭
    <attribute name="stroke">     ⎫
        <data type="string"/>     ⎬ 710
    </attribute>                  ⎭
    <attribute name="stroke-width"> ⎫
        <data type="double"/>       ⎬ 708
    </attribute>                    ⎭
    <empty/>
</element>
```

701

```
<element name="text"> ~704
    <attribute name="x">           ⎫
        <data type="double"/>      ⎬ 711
    </attribute>                   ⎭
    <attribute name="y">           ⎫
        <data type="double"/>      ⎬ 712
    </attribute>                   ⎭
    <attribute name="font-size">   ⎫
        <data type="double"/>      ⎬ 713
    </attribute>                   ⎭
    <text/>
</element>
</define>
```

EXEMPLARY SCHEMA INCLUDING A PLURALITY OF OBJECTS

701
```
<define name="button">
  <element name="circle">
    <attribute name="cx">
      <data type="double"/>
    </attribute>
    <attribute name="cy">
      <data type="double"/>
    </attribute>
    <attribute name="r">
      <data type="double"/>
    </attribute>
    <attribute name="fill">
      <data type="string"/>
    </attribute>
    <attribute name="stroke">
      <data type="string"/>
    </attribute>
    <attribute name="stroke-width">
      <data type="double"/>
    </attribute>
    <empty/>
  </element>
```

702
```
<element name="text">
  <attribute name="x">
    <data type="double"/>
  </attribute>
  <attribute name="y">
    <data type="double"/>
  </attribute>
  <attribute name="font-size">
    <data type="double"/>
  </attribute>
  <text/>
</element>
</define>
```

801
```
<define name="textField">
  SCHEMA OF TEXTFIELD
</define>
```

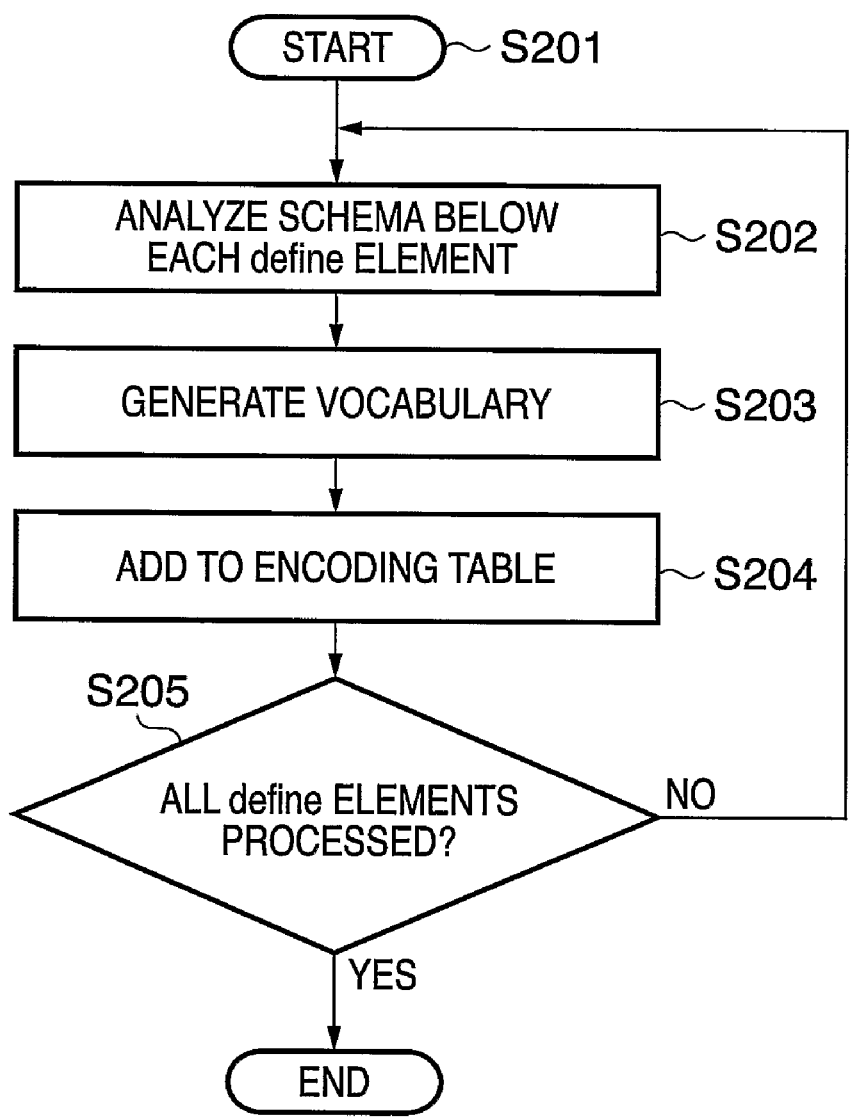

FIG. 11

701 VOCABULARY OF CONTENT MODEL APPEARING REPEATEDLY 702

```
<element name="circle">
  <attribute name="cx">
    <data type="double"/>
  </attribute>
  <attribute name="cy">
    <data type="double"/>
  </attribute>
  <attribute name="r">
    <data type="double"/>
  </attribute>
  <attribute name="fill">
    <data type="string"/>
  </attribute>
  <attribute name="stroke">
    <data type="string"/>
  </attribute>
  <attribute name="stroke-width">
    <data type="double"/>
  </attribute>
  <empty/>
</element>
```

```
<element name="text">
  <attribute name="x">
    <data type="double"/>
  </attribute>
  <attribute name="y">
    <data type="double"/>
  </attribute>
  <attribute name="font-size">
    <data type="double"/>
  </attribute>
  <text/>
</element>
```

FIG. 12

EXEMPLARY ENCODING TABLE

| CODE | VOCABULARY |
|------|------------|
| 0x00 | START TAG |
| 0x01 | END TAG |
| 0x02 | ATTRIBUTE |
| 0x03 | ELEMENT CONTENT |
| 0x04 | NAMESPACE URI |
| 0x05 | START FLAG OF CONTENT MODEL APPEARING REPEATEDLY |
| 0x06 | END FLAG OF CONTENT MODEL APPEARING REPEATEDLY |
| 0x07 | `<element name="circle">`<br>`  <attribute name="cx">`<br>`    <data type="double"/>`<br>`  </attribute>`<br>`  <attribute name="cy">`<br>`    <data type="double"/>`<br>`  </attribute>`<br>`  <attribute name="r">`<br>`    <data type="double"/>`<br>`  </attribute>`<br>`  <attribute name="fill">`<br>`    <data type="string"/>`<br>`  </attribute>`<br>`  <attribute name="stroke">`<br>`    <data type="string"/>`<br>`  </attribute>`<br>`  <attribute name="stroke-width">`<br>`    <data type="double"/>`<br>`  </attribute>`<br>`  <empty/>`<br>`</element>` |

```
<element name="text">
  <attribute name="x">
    <data type="double"/>
  </attribute>
  <attribute name="y">
    <data type="double"/>
  </attribute>
  <attribute name="font-size">
    <data type="double"/>
  </attribute>
  <text/>
</element>
```

| CODE | VOCABULARY |
|---|---|
| 0x00 | START TAG |
| 0x01 | END TAG |
| 0x02 | ATTRIBUTE |
| 0x03 | ELEMENT CONTENT |
| 0x04 | NAMESPACE URI |
| 0x05 | START FLAG OF CONTENT MODEL APPEARING REPEATEDLY |
| 0x06 | END FLAG OF CONTENT MODEL APPEARING REPEATEDLY |
| 0x07 | `<element name="circle">`<br>`<attribute name="cx">`<br>`<data type="double"/>`<br>`</attribute>`<br>`<attribute name="cy">`<br>`<data type="double"/>`<br>`</attribute>`<br>`<attribute name="r">`<br>`<data type="double"/>`<br>`</attribute>`<br>`<attribute name="fill">`<br>`<data type="string"/>`<br>`</attribute>`<br>`<attribute name="stroke">`<br>`<data type="string"/>`<br>`</attribute>`<br>`<attribute name="stroke-width">`<br>`<data type="double"/>`<br>`</attribute>`<br>`<empty/>`<br>`</element>`<br>`<element name="text">` |
| 0x08 | `<attribute name="x">`<br>`<data type="double"/>`<br>`</attribute>`<br>`<attribute name="y">`<br>`<data type="double"/>`<br>`</attribute>`<br>`<attribute name="font-size">`<br>`<data type="double"/>`<br>`</attribute>`<br>`<text/>`<br>`</element>` |
| 0x09 | svg |
| 0x0a | xmlns="http://www.w3.org/2000/svg" |
| 0x0b | 100 |
| 0x0c | 30 |
| 0x0d | none |
| 0x0e | black |
| 0x0f | 5 |
| 0x10 | 90 |
| 0x11 | 120 |
| 0x12 | 50 |
| 0x13 | 1 |
| 0x14 | 200 |
| 0x15 | 190 |
| 0x16 | 2 |
| 0x17 | 300 |
| 0x18 | 290 |
| | 3 |

FIG. 15

```
<svg xmlns="http://www.w3.org/2000/svg">
        ↑                    ↑
     0x00 0x08            0x04 0x09

<circle cx="100" cy="100" r="30" fill="none"
   stroke="black" stroke-width="5"/>
 0x05 0x07  START CODE OF CONTENT MODEL APPEARING REPEATEDLY 0x0a 0x0b 0x0c 0x0d 0x0e  CODES OF ATTRIBUTE VALUES OF circle ELEMENT <text x="90" y="120" font-size="50">1</text>
 0x0f 0x10 0x11 0x12  CODES OF ATTRIBUTE VALUES AND ELEMENT CONTENT
                      OF text ELEMENT 0x06  END CODE OF CONTENT MODEL APPEARING REPEATEDLY
```

F I G. 16

```
<circle cx="200" cy="100" r="30" fill="none"
    stroke="black" stroke-width="5"/>
```
0x05 0x07 START CODE OF CONTENT MODEL APPEARING REPEATEDLY 0x13 0x0a 0x0b 0x0c 0x0d 0x0e CODES OF ATTRIBUTE VALUES OF circle ELEMENT

```
<text x="190" y="120" font-size="50">2</text>
```
0x14 0x10 0x11 0x15 CODES OF ATTRIBUTE VALUES AND ELEMENT CONTENT OF text ELEMENT 0x06 END CODE OF CONTENT MODEL APPEARING REPEATEDLY

ENCODING/DECODING APPARATUS, METHOD AND COMPUTER PROGRAM

TECHNICAL FIELD

The present invention relates to an information processing technique for encoding and decoding XML data.

BACKGROUND ART

Since structured documents such as XML documents and HTML documents are in text format, processing apparatuses that analyze these structured documents have largely performed reading/writing, saving and the like of the structured documents in text format. However, since structured documents include redundant data, it takes time for a computer to read/write a structured document as text data. Therefore, a technology has been developed in recent years called binary XML that reduces data size by representing/processing structured documents in binary data format. Note that XML stands for eXtensible Markup Language, while HTML stands for HyperText Markup Language.

With Fast Infoset developed by Sun Microsystems, for example, vocabularies such as element names and attribute names included in the XML data are encoded by being allocated numbers in the order in which they appear in XML data. This enables the size of XML data to be reduced. A table showing the correspondence between the codes and vocabularies is called an encoding table. Note that Fast Infoset is discussed in detailed at the page reached by the following link:

http://www.iso.org/iso/en/CatalogueDetailPage.Catalogue
Detail?CSNUMBER=41327&scopelist=PROGRAMME Where there is an array of numeric values partitioned by separators such as commas and spaces in the attribute values and element content, XEUS, developed by KDDI partitions the XML data with the separators and encodes the numeric values, rather than encoding the entire data as a character string. This enables XML data to be efficiently compressed. Note that XEUS stands for XML document Encoding with Uniformed Sheet.

With the configuration disclosed in Japanese Patent Laid-Open No. 2005-215951 and in BiM developed by MPEG, type information of data included in XHTML and SVG schemas which define the grammar (document structure) of structured documents is analyzed, and optimal encodings for the data type of the attribute values and element content are performed. This enables XML data to be efficiently compressed. Note that MPEG stands for Moving Picture Experts Group. BiM stands for Binary MPEG format for XML. Technical information on BiM can be acquired from the following link:

http://www.iso.ch/iso/en/prods-
services/popstds/mpeg.html

SVG stands for Scalable Vector Graphics. XHTML stands for Extensible HyperText Markup Language.

However, the schemas of XHTML, SVG and the like used with conventional technology define the generic grammar (document structure) of a structured document. Therefore, because conventional technology uses schema information defining the generic grammar of a structured document, application-specific document structure is not encoded, even when XML data of the same document structure appears repeatedly.

For example, assume there is a structured document written in SVG such as that in FIG. 1A. FIG. 1A illustrates a structured document in which the same document structure appears repeatedly. In FIG. 1A, reference numerals 9101 to 9103 have the same document structure, only the variables such as the attribute values and character strings are different. In this structured document, an empty element called "circle" has a plurality of attribute values cx, cy, r, fill, stroke, and stroke-width. A "text" element appears after this "circle" element. The "text" element has a plurality of attribute values x, y, and font-size, and includes a character string as element content. The "circle" elements and "text" elements included in this structured document are assumed to represent buttons, as shown by reference numeral 9104 in FIG. 1B.

With conventional binary XML technology, an encoding table such as in FIG. 2 is generated and a structured document such as shown in FIGS. 3 and 4 is encoded by analyzing the datatypes of the attribute values in the "circle" elements using SVG schema, and performing encoding for those datatypes. However, as with the button objects in FIG. 1A, there is a limit to the reduction in data size, since codes are not allocated to application-specific document structure that appears repeatedly.

FIG. 2 illustrates an encoding table generated using conventional binary XML technology. FIGS. 3 and 4 illustrate an encoded document encoded using conventional binary XML technology. With the conventional configuration, a code is allocated for every element name and attribute name, as in FIGS. 2 to 4, despite the same document structure being repeatedly used in the structured document for encoding, as in FIG. 1A. Therefore, there is still room for further reductions in the data size of an encoded document generated using conventional encoding methods.

DISCLOSURE OF INVENTION

The present invention has been made in consideration of the above problems, and has as its object to provide a technique that enables a structured document to be encoded at an even smaller data size.

According to one aspect of the present invention, an information processing apparatus comprises:

a readout unit adapted to read out, from a storage unit, correspondence information that includes a document structure of a structured document and a first code for encoding the document structure;

a verification unit adapted to verify whether grammar of a portion included in a structured document for processing is valid, based on the document structure included in the correspondence information; and an encoding unit adapted to encode the structured document using the first code, in relation to a portion whose grammar is verified as being valid by the verification unit.

According to another aspect of the present invention, a control method of an information processing apparatus that generates an encoded document by encoding a structured document, comprises the steps of:

a readout unit reading out, from a storage unit, correspondence information that includes a document structure of a structured document and a first code for encoding the document structure;

a verification unit verifying whether grammar of a portion included in a structured document for processing is valid, based on the document structure included in the correspondence information; and an encoding unit encoding the structured document using the first code, in relation to a portion whose grammar is verified as being valid in the verification step.

Further features of the present invention will become apparent from the following description of exemplary embodiments (with reference to the attached drawings).

BRIEF DESCRIPTION OF DRAWINGS

FIGS. 1A & 1B illustrate a structured document in which the same document structure appears repeatedly.

FIG. 2 illustrates an encoding table generated using conventional binary XML technology.

FIG. 7 shows a schema written in RELAX NG in relation to XML data in which the same document structure appears repeatedly.

FIG. 8 shows an example in which a textfield object for accepting text inputs from a user is defined in addition to a button object.

FIG. 10 is a flowchart showing in detail the processing procedures executed in step S103.

FIG. 11 shows a vocabulary generated based on the schema of a button object.

FIG. 12 illustrates an encoding table.

FIG. 14 illustrates an encoding table after a series of encoding processes has been performed.

FIGS. 15, 16 & 17 illustrate an encoded document stored in an internal memory after the series of encoding processes has been performed.

BEST MODE FOR CARRYING OUT THE INVENTION

Hereinafter, an exemplary configuration of an encoding apparatus (information processing apparatus) and a decoding apparatus according to the present embodiment will be described with reference to the accompanying drawings. In the interests of simplicity, it will be illustratively assumed in the present embodiment that the encoding apparatus and the decoding apparatus are realized by the same information processing apparatus, although the encoding and decoding apparatuses may be realized by separate apparatuses. The constituent elements described in this embodiment are merely illustrative, and it is not intended to limit the scope of the invention to only these constituent elements.

Configuration of Information Processing Apparatus

Figure 3:
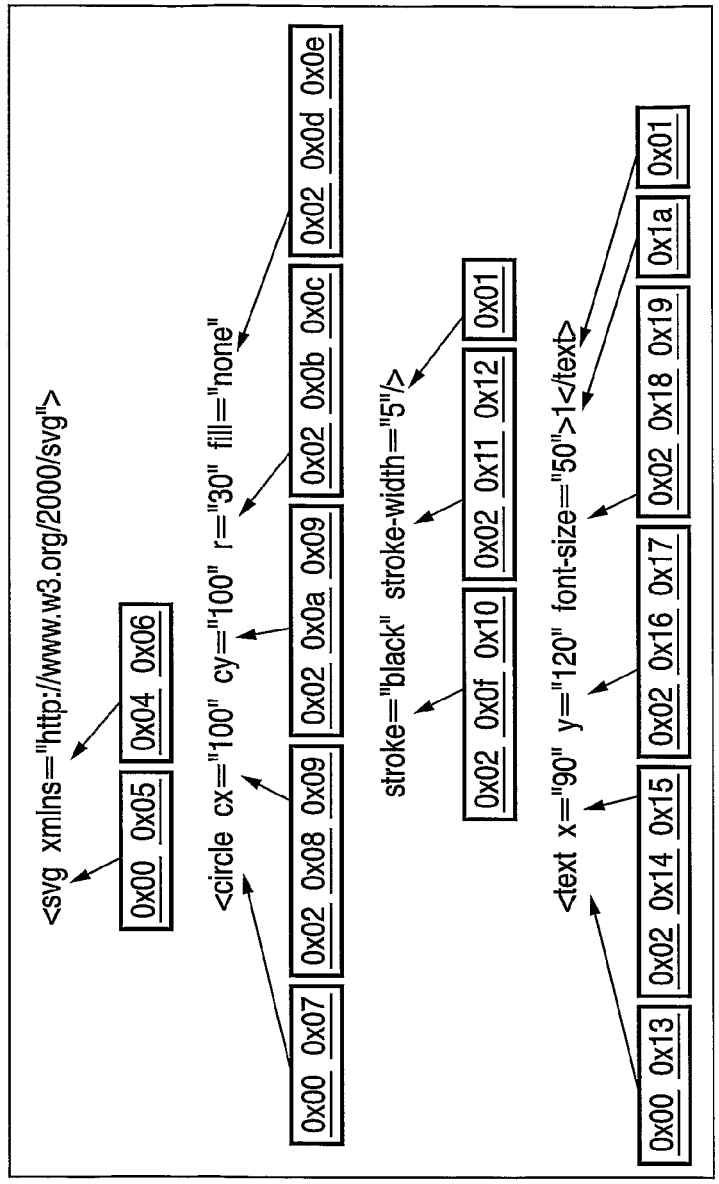
FIGS. 3 & 4 illustrate an encoded document encoded using conventional binary XML technology.
Figure 4:
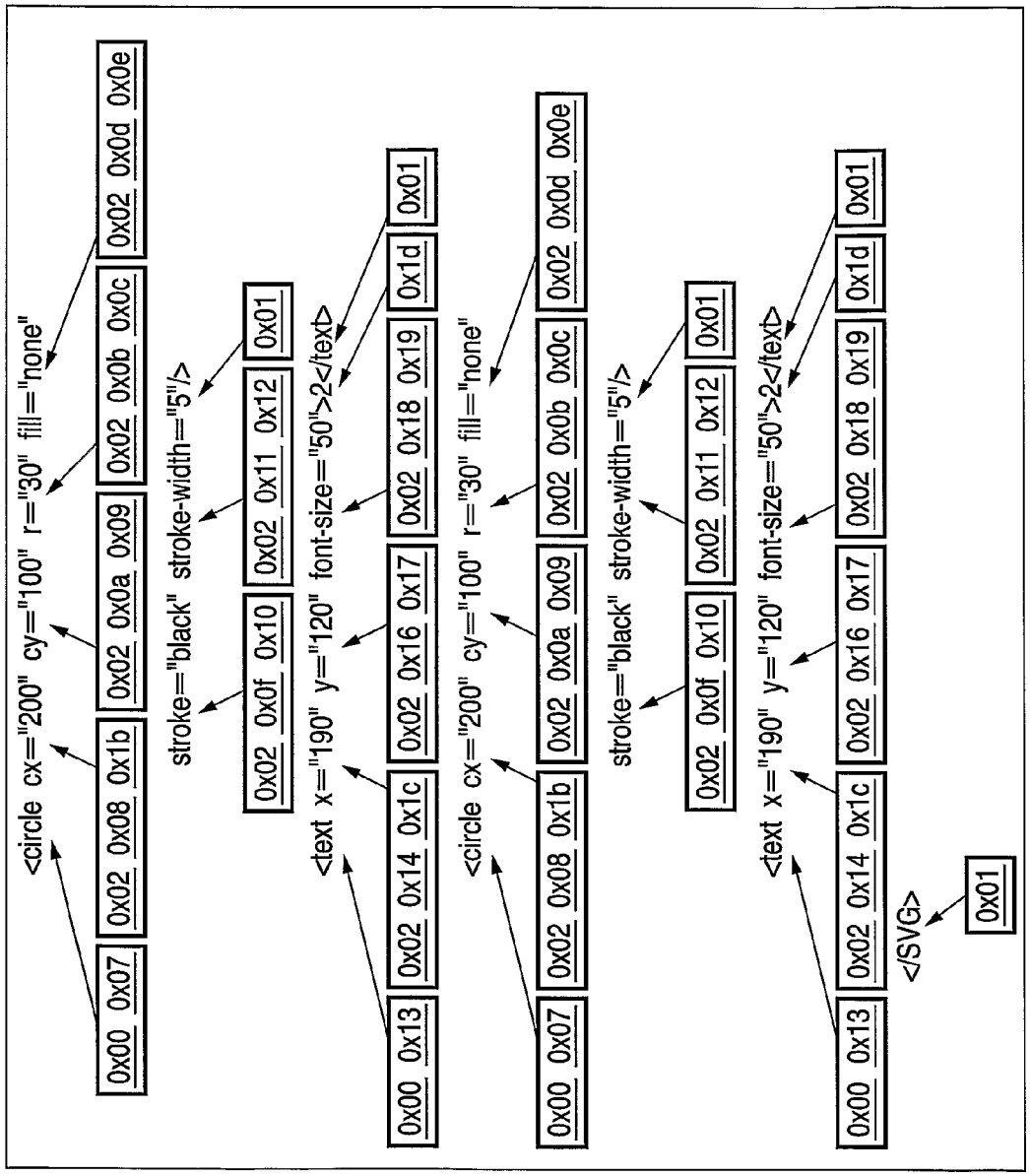
Figure 5:
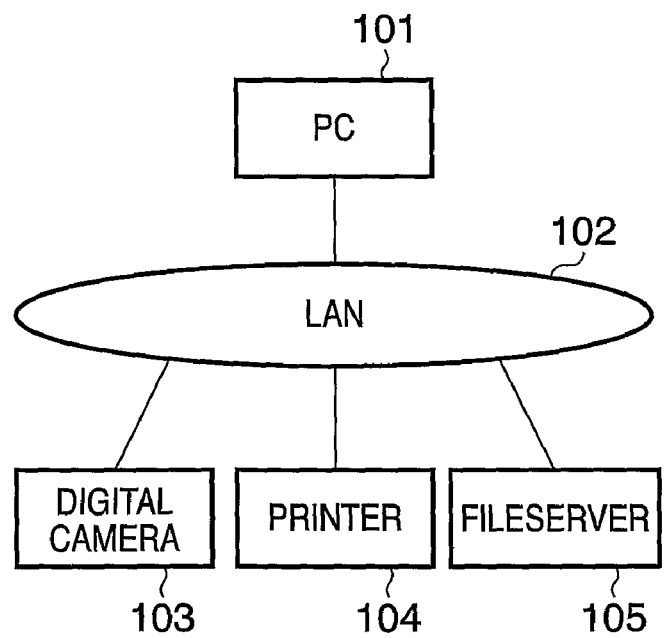
FIG. 5 is a configuration diagram showing an overview of a system that includes an information processing apparatus.

FIG. 5 is a configuration diagram showing an overview of a system that includes an information processing apparatus according to the present embodiment. In FIG. 5, a personal computer (PC) 101, as an information processing apparatus according to the present embodiment, is connected to a local area network (LAN) 102. A digital camera 103, a printer 104 and a fileserver 105 are also connected to the LAN 102.

Figure 6:
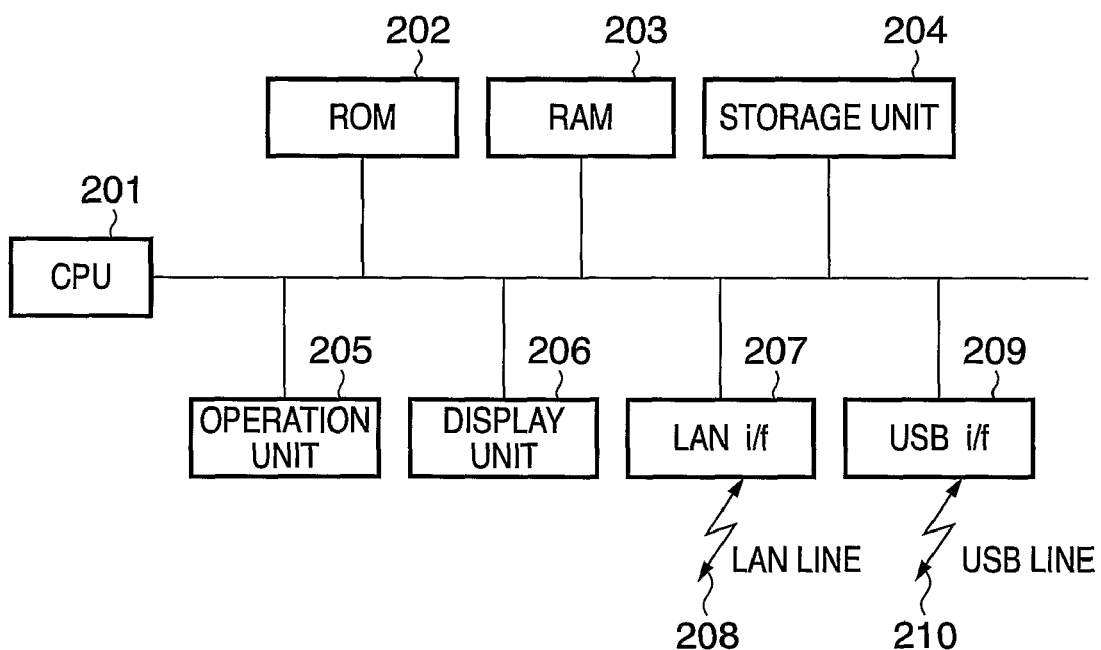
FIG. 6 is a block diagram showing the configuration of a PC.

FIG. 6 is a block diagram showing the configuration of the PC 101, as an information processing apparatus according to the present embodiment. In FIG. 6, a CPU 201 is a system control unit that controls the entire apparatus. A ROM 202 is a storage apparatus that stores the control programs of the CPU and various fixed data. The RAM 203, constituted by an SRAM, DRAM or the like, is a storage apparatus for storing program control variables and the like. Various setting parameters and work buffers are also stored in the RAM 203. A storage unit 204, constituted by a hard disk or the like, is a storage apparatus for storing various data files containing document data, image data and the like. An operation unit 205, constituted by a keyboard, mouse, touch panel or the like, is an instruction input apparatus for an operator to perform various input operations. A display unit 206 is a display apparatus such as a television that displays images. A LAN i/f 207 is an interface for connecting to a LAN line 208. A USB i/f 209 is an interface for connecting to a USB line 210.

Note that although it is assumed in the present embodiment that the information processing apparatus according to the present embodiment is realized by a PC, the present invention is not limited to this configuration. For example, the information processing apparatus according to the present embodiment may be realized by a workstation (WS), a personal digital assistant (PDA), or the like.

Also, in the interests of convenience, the present embodiment describes a configuration in which the information processing apparatus according to the present embodiment is realized by a single apparatus. However, the information processing apparatus according to the present embodiment may be realized by a configuration in which resources are distributed to a plurality of apparatuses. For example, storage and computation resources may be distributed to a plurality of apparatuses. Alternatively, resources may be distributed for each constituent element realized virtually on the information processing apparatus, and processing performed in parallel.

Hereinafter, a method of reducing data size by encoding the actual document structure will be described in relation to a structured document in which the same document structure appears repeatedly, as with the button objects 9101 to 9103 in FIG. 1A. Note that although it is assumed in the present embodiment that processing is performed on XML data as an exemplary structured document, the present invention is not limited to this configuration.

Schema

FIG. 7 shows a schema written in RELAX NG (REgular LAnguage for XML Next Generation) in relation to XML data in which the same document structure appears repeatedly, which is exemplified in FIG. 1A. This schema needs to be created prior to encoding, based on the document structure of the structured document. The information processing apparatus (PC 101) according to the present embodiment encodes a structured document that includes a document structure appearing repeatedly, based on this schema.

The schema illustrated in FIG. 7 defines the schema of a "circle" element and a "text" element constituting a single button object in 701 and 702 respectively, using a "define" element in RELAX NG. These "circle" and "text" elements are defined using an "element" element in RELAX NG (703, 704). The attributes of the "circle" and "text" elements are defined using an "attribute" element in RELAX NG. Here, the datatype of the attribute values of the attributes cx, cy, r and stroke-width included in the "circle" element is defined as "double" (705-708), while the datatype of the attribute values of the attributes fill and stroke is defined as "string" (709, 710). The various datatypes are defined in the W3C recommendation "XML Schema Part 2: Datatypes Second Edition" (http://www.w3.org/TR/2004/REC-xmlschema-2-20041028/datatypes.html). The datatype of the attribute values of the attributes x, y and font-size included in the "text" element is defined as "double" (711-713). Note that in the present embodiment data such as attribute values and element content are collectively referred to as variables.

If there are objects other than the button object composed of the "circle" and "text" elements, the schema of these objects are defined as the subelements of different "define" elements. FIG. 8 shows an example in which a textfield object for accepting text inputs from a user is defined in addition to the above button object. In FIG. 8, reference numeral 801 shows the object definition of the textfield. As shown in FIG. 8, a plurality of repeatedly occurring document structures of objects can be defined by providing any number of "define" elements.

Here, RELAX NG is described as an example of a schema language in the present embodiment, although other schema languages may be used such as DTD and XML Schema (W3C XML Schema). Alternatively, shorthand for schema may be used (http://www.oasis-open.org/committees/relax-ng/compact-20021121.html)

Encoding Structured Documents

Figure 9A:
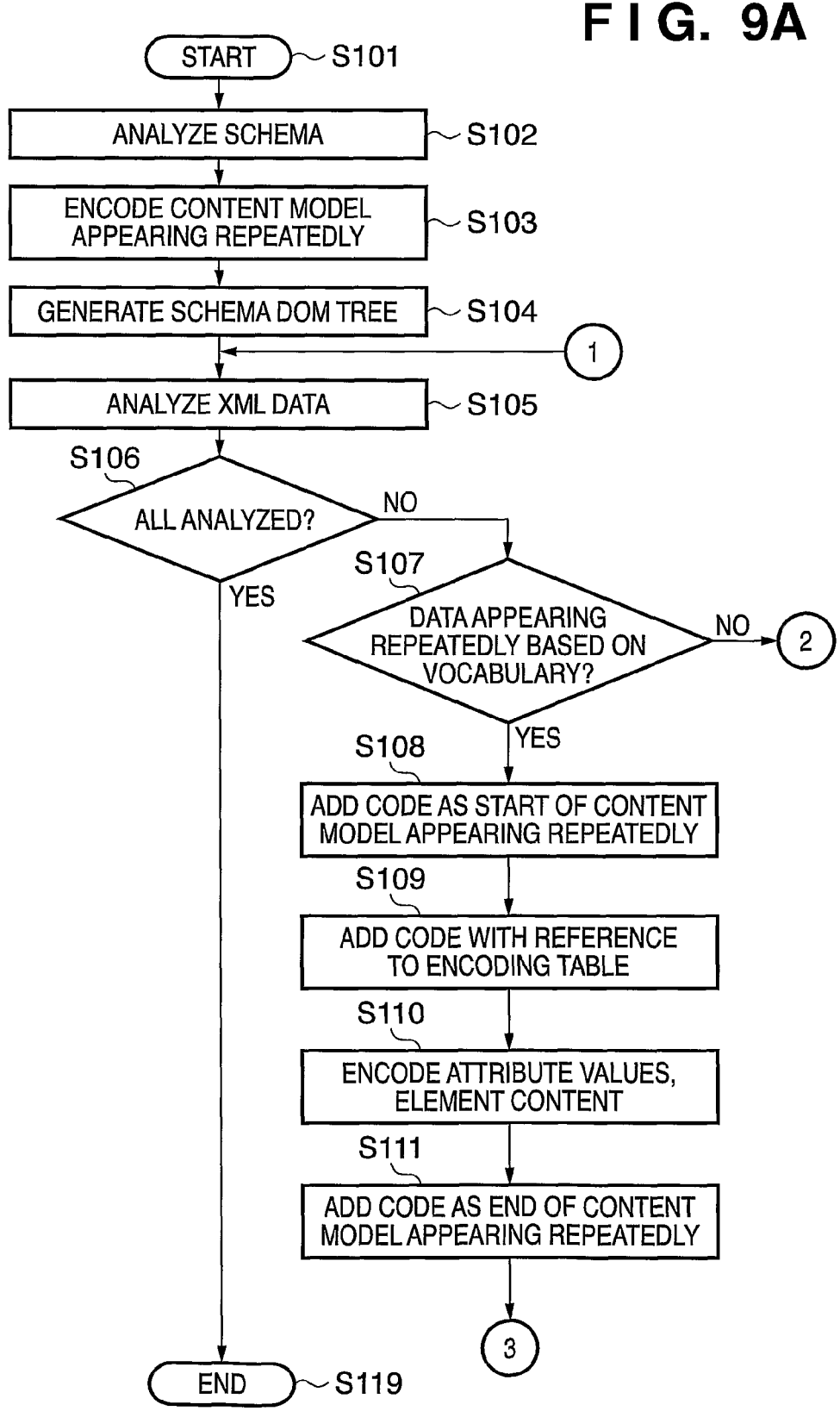
FIGS. 9A and 9B are flowcharts showing processing procedures for encoding a document structure.
Figure 9B:
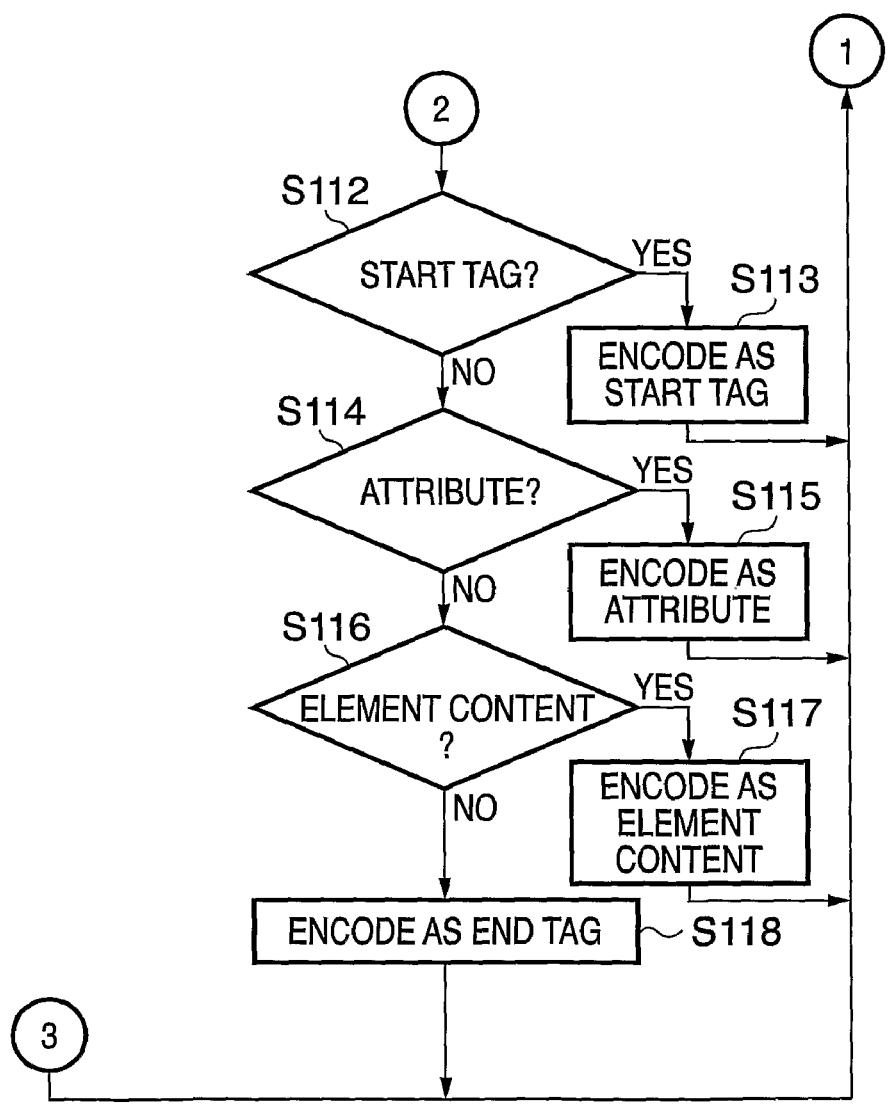

Next, procedures performed by the PC 101 in relation to a structured document in which the same document structure appears repeatedly to encode the actual document structure will be described with reference to FIGS. 9A and 9B. FIGS. 9A and 9B are flowcharts showing processing procedures for encoding a document structure. The following processing is executed under the control of the CPU 201, included in the PC 101, which is an information processing apparatus according to the present embodiment.

When the processing is started in step S101, firstly the schema for processing as illustrated in FIG. 7 is read out from the storage unit 204 or the like, analyzed, and stored in an internal memory (step S102).

Next, a content model appearing repeatedly is encoded using the data of the schema stored in the internal memory (step S103). Step S103 will now be described in detail with reference to FIG. 10. FIG. 10 is a flowchart showing in detail the processing procedures executed in step S103.

When processing (step S103) is started in step S201, firstly, in relation to the schema stored in the internal memory, the schema below each "define" element that defines a content model appearing repeatedly is analyzed (step S202). Next, the schema below the "define" element is stored in the internal memory as a vocabulary in an encoding table (step S203). FIG. 11 shows a vocabulary generated based on the schema of the button object illustrated in FIG. 7. As shown in FIG. 11, the content of the schema below the "define" element defining the button object corresponds to a vocabulary.

Next, the vocabulary generated in step S203 is added to the encoding table (step S204). That is, in steps S202 to S204, schema information showing the document structure of the structured document is analyzed, codes are allocated to the document structure, and the encoding table is updated based on the correspondence relation between the document structure and the codes. Respective codes are assigned to the partial document structures (in the present embodiment, partial document structures starting with <define> and ending with </define>) included in the schema. Note that in step S204 a start flag and an end flag of the content model appearing repeatedly are added to the encoding table. The start flag indicates the start of the vocabulary of the document structure appearing repeatedly, while the end flag indicates the end of the vocabulary of the document structure appearing repeatedly. That is, the start flag and the end flag function as a third code for encoding a valid range in comparison with a predefined document structure. These start and end flags are also used as a code indicating the start and end with respect to other document structures that appear repeatedly.

The above procedures are performed for each "define" element of the schema stored in the internal memory. That is, when the processing of step S204 ends, it is determined in step S205 whether the processing of steps S202 to S204 has been completed for all "define" elements. If all "define" elements have been processed (YES in step S205), step S103 is ended. If all "define" elements have not been processed (NO in step S205), the processing returns to step S202, and the processing of steps S202 to S204 is executed for a "define" element not yet processed.

FIG. 12 illustrates an encoding table after the end of step S103. A code 0x05 stores the start flag of the content model appearing repeatedly as vocabulary (1201), and a code 0x06 stores the end flag of the content model appearing repeatedly as vocabulary (1202). A code 0x07 stores the vocabulary of FIG. 11 (1203). If there are other content models that appear repeatedly, the schema of those content models is added as vocabulary from the subsequent code 0x08. As in FIG. 12, the encoding table functions as correspondence information that includes the document structure of the structured document and a first code for encoding the document structure. Note that the above encoding table may be created in advance and stored in the storage unit 204 or the like, and a readout unit realized by the functions of the information processing apparatus may read out the stored encoding table for use from the storage unit 204 when necessary.

Returning to the description of FIGS. 9A and 9B, when the processing of step S103 ends, next a DOM (Document Object Model) tree is generated based on the analyzed schema information, and the generated DOM tree is saved to the internal memory after converting the structure thereof to a simple tree structure (step S104). Simplified processing of the tree structure is performed based on the simplified processing procedures of the RELAX NG specifications (http://www.relaxng.org/spec-20011203.html#simplification). Each node in the schema DOM tree has a flag showing whether XML data has been verified, and these flags are initialized to an unverified state with respect to the XML data.

Next, in the processing from step S105, XML data is analyzed and encoded using the encoding table of FIG. 12 generated in step S103. The structured document encoded and stored in the internal memory is here called an encoded document. The encoded document in an initial state is assumed not to store any codes. Firstly, in step S105, analysis of XML data not yet analyzed is performed.

Next, it is determined whether all XML data of the structured document has been analyzed (step S106). If all XML data has been analyzed (YES in step S106), the processing ends. If all XML data has not been analyzed (NO in step S106), the processing proceeds to step S107.

In step S107, it is verified whether the XML data is data that appears repeatedly, based on the schema stored as vocabulary in the encoding table. For example, in parsing the XML data in FIG. 1A, the XML data is verified as schema, or vocabulary, of the button object after the elements have been read and saved to the internal memory.

Figure 13:
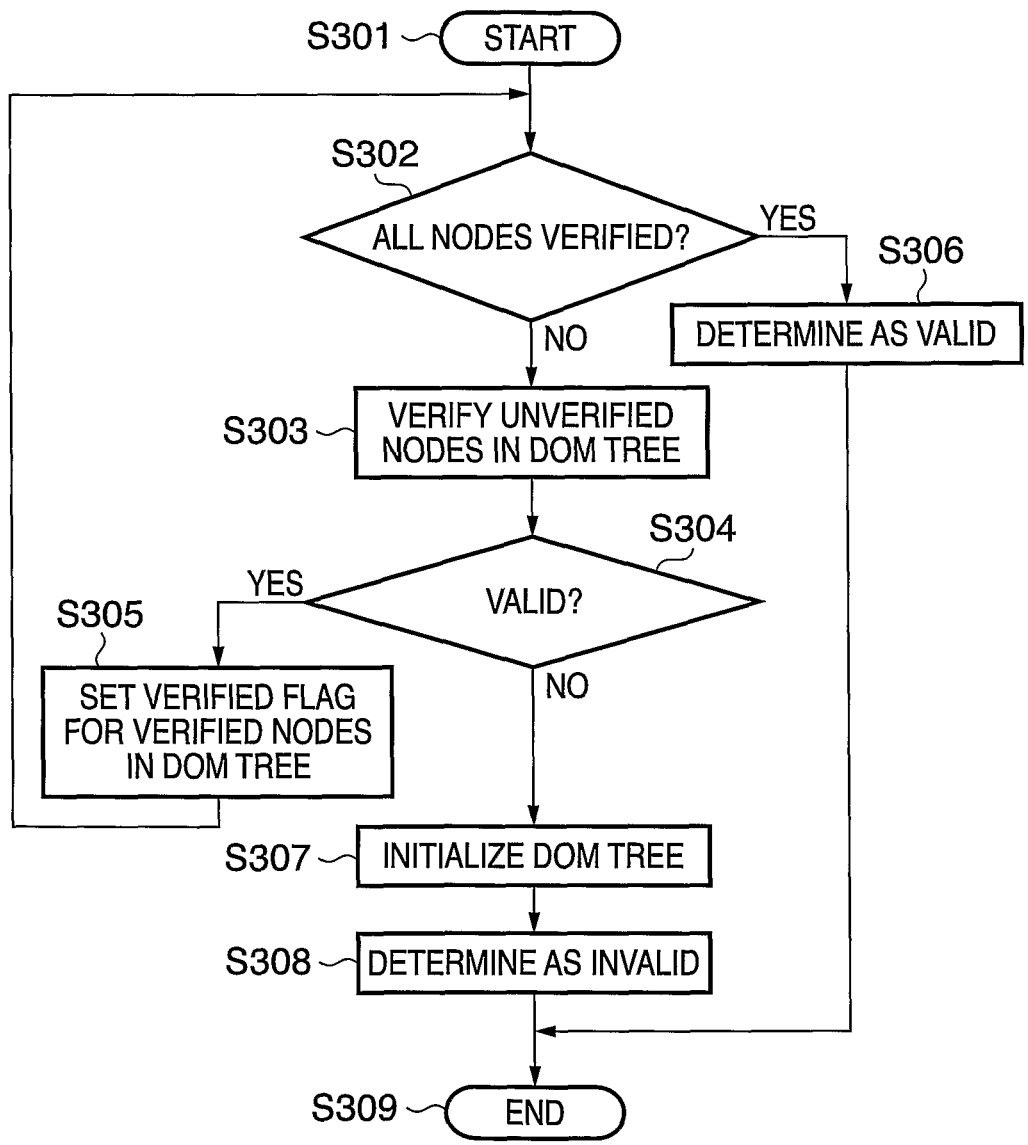
FIG. 13 is a flowchart showing processing procedures for verifying whether XML data is a content model that appears repeatedly.

The procedures executed in step S107 for verifying XML data as schema, or vocabulary, allocated to the code 0x07 of FIG. 11 will now be described in detail using FIG. 13. FIG. 13 is a flowchart showing the processing procedures for verifying whether XML data is a content model that appears repeatedly.

When the processing is started (step S301), firstly it is determined whether all nodes have been verified by checking, for each node in the schema DOM tree stored in the internal memory in step S104, the flag indicating whether the node has been verified as XML data (step S302). If it is determined that not all nodes have been verified (step NO at S302), unverified nodes in the DOM tree related to XML data are verified (step S303). At this time, element name, element namespace, number of available attributes, attribute name, attribute namespace, element content datatype, and attribute value datatype are verified.

Next, in step S304, it is determined whether the XML data is valid with respect to unverified nodes. That is, in step S304, validity verification is performed to verify whether the grammar of a portion included in the XML data for processing is valid, based on the document structure shown in the encoding table. If it is determine to be valid (YES in step S304), the processing proceeds to step S305. In step S305, a verified flag is set for the node of the DOM tree referred to in the verification, and the processing returns to step S302. The verification process is similarly repeated for all nodes with respect to subsequent XML data, and a verified flag is set if the XML data is determined to be valid. At this time, verified XML data is continuously saved to the internal memory without being released, until the verification process ends for this schema.

After the processing of steps S303 to S305 has thus been repeated, it is determined in step S302 that all nodes in the schema DOM tree have been verified (YES in step S302), and the processing proceeds to step S306. In step S306, it is determined that the partial XML data verified up until this point is valid, and step S107 is ended (step S309). Passing through step S306 equates to YES in step S107. Consequently, once the processing of step S107 ends, the content model that appears repeatedly is encoded in steps S108 to S111. Note that the code of the content model functions as the first code.

On the other hand, if it is determined during the verification of step S304 that XML data is invalid (NO in step S304), all validated flags of the DOM tree are initialized to an unverified state in step S307. Next, in step S308, it is determined that the XML data is invalid, and the processing of step S107 is ended (step S309). Passing through step S308 equates to NO in step S107. Consequently, when the processing of step S107 ends, the conventional encoding processes of steps S112 to S118 are performed using the verified XML data saved to the internal memory up until that point.

In terms of the structured document in FIG. 1A, for example, the "svg" element appears initially, so this is determined in step S304 to be invalid (NO in step S304). Therefore, the processing of steps S112 to S118 is performed. The processing then returns to step S105, and proceeds to step S107 via step S106 (NO in step S106). In step S107, the "circle" element that follows the "svg" element is determined to be valid in step S304 as a result of the verification in step S303 (YES in step S304). Therefore, in step S305, a verified flag is set for the nodes in the DOM tree referred to in verifying the "circle" element. Then, when the "text" element that follows is read in step S302, it is determined that all nodes of the DOM tree have not been validated (NO in step S302). Therefore, the "text" element is verified with respect to unverified nodes in step 303. The XML data is determined to be valid as a result of the verification, and a verified flag is similarly set for the nodes referred to in the verification process.

Since all nodes in the DOM tree are determined to have been verified when the processing of step S302 is next executed (YES in step S302), the "circle" and "text" elements are determined to be valid as constituent elements of the button objects (step S306). Therefore, the determination result in step S107 is YES, and the processing proceeds to step S108, where the code 0x05 in the encoding table of FIG. 11 is stored in the encoded document as the code showing the start of the content model appearing repeatedly. The code corresponding to the vocabulary (i.e., schema) used in the verification just ended is added to the encoded document (step S109). In the present invention, the code of the content model that appears repeatedly is 0x07, so the code 0x07 is added to the encoded document. Next, the attribute values and element content included in the content model that appears repeatedly are analyzed and added to the encoding table, and the codes thereof are similarly added to the encoded document in order (step S110). After the content model that appears repeatedly has been encoded, 0x06 is added to the encoded document as the code showing the end of the content model (step S111). Here, the XML data relating to the "circle" and "text" elements just stored in the internal memory is released. Then, all XML data is analyzed in step S105, and it is determined in step S106 whether the encoding has ended for all XML data.

If it cannot be determined in step S107, with respect to the schema (i.e., vocabulary) of the encoding table, that the XML data is a content model appearing repeatedly (NO in step S107), the processing proceeds to step S112. In steps S112 to S118, the elements of the XML data temporarily stored in the internal memory are encoded. For example, consider the case where the above "circle" element is determined in step S304 to be valid, whereas the "text" element that follows is determined to be invalid. In this case, encoding processes are performed respectively on the "circle" element stored in the internal memory when determined to be valid, and the following "text" element determined to be invalid.

First, it is determined whether the initial data is a start tag (step S112), and if it is determined to be a start tag (YES in step S112), this data is encoded as a start tag (step S113). If it cannot be determined in step S112 that the initial data is a start tag (NO in step S112), it is determined whether the data is an attribute (step S114). If it is determined to be an attribute (YES in step S114), the data is encoded as an attribute (step S115). If it cannot be determined in step S114 that the data is an attribute (NO in step S114), it is determined whether the data is element content (step S116). If it is determined to be element content (YES in step S116), the data is encoded as element content (step S117). If it is not determined in step S116 that the data is element content (NO in step S116), the data is encoded as an end tag (step S118). After the encoding processes have ended, the XML data temporarily stored in the internal memory is released.

Figure 17:
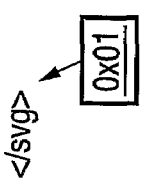

FIG. 14 illustrates the encoding table after the series of encoding processes has been performed. FIGS. 15 to 17 illustrate the encoded document stored in the internal memory after the series of encodings has been performed. The code of the content model that appears repeatedly is stored after the code 0x05 indicating the start of this content model. The codes of the attribute values and element content included in this content model are stored after the code of the content model. The code indicating the end of this content model is then stored after the set of codes of the attribute values and element content included in the content model. As described above, the structured document of FIG. 1A is encoded as shown in the encoded document of FIGS. 15 to 17, using the codes in the encoding table shown in FIG. 14. On comparing FIGS. 3, 4 and 15-17, it is clear that the data size of the encoded document resulting from the configuration according to the present embodiment is smaller, and that it is thus possible to encode a structured document with a smaller data size. This is because in the present embodiment a code (first code) is allocated to a content model that appears repeatedly, that is, to the document structure of a structured document that appears repeatedly, and encoding is performed using this code.

Figure 18:
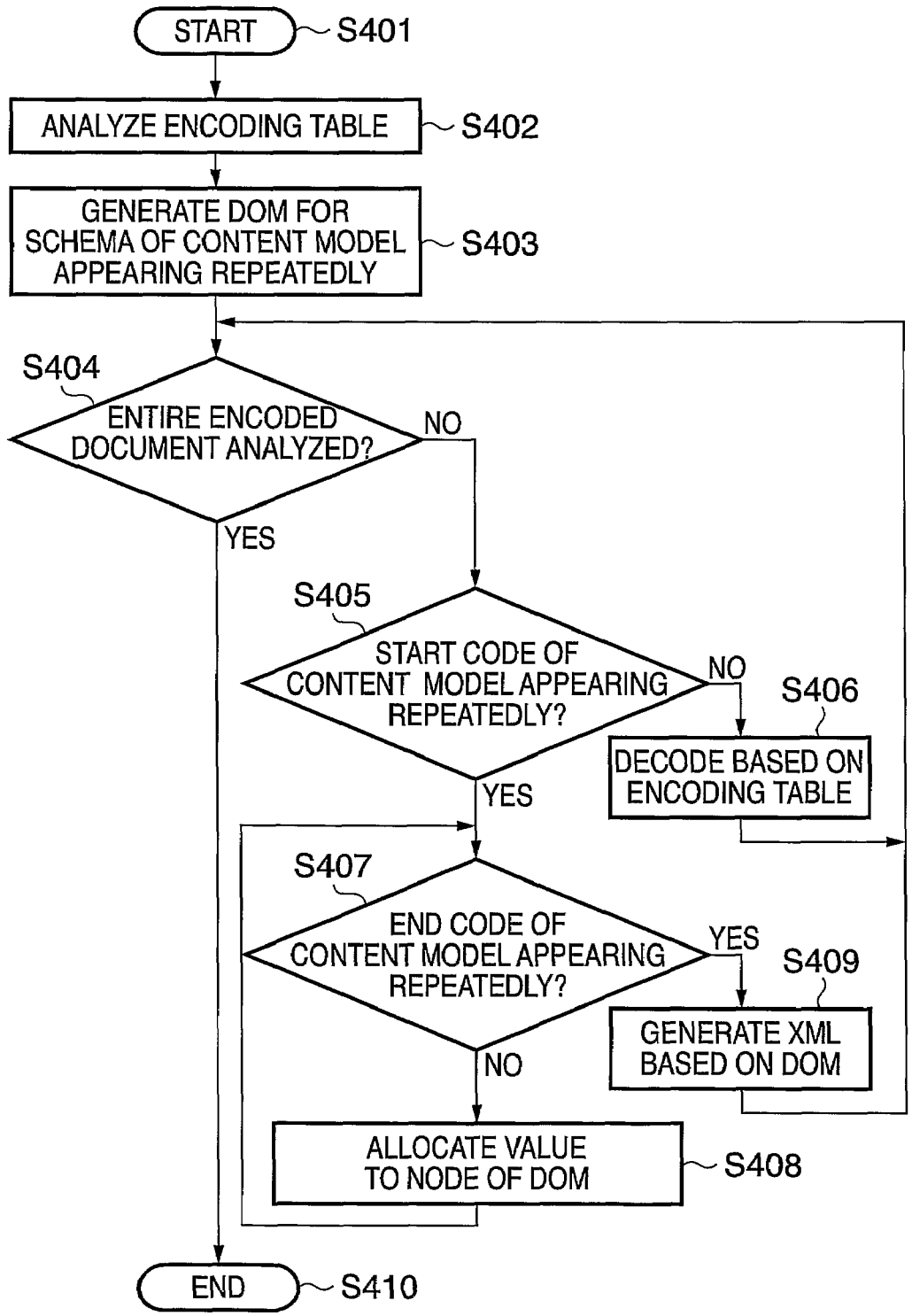
FIG. 18 is a flowchart showing processing procedures for decoding an encoded document.

Next, the process of decoding an encoded document to obtain the original structured document will be described. FIG. 18 is a flowchart showing the processing procedures for decoding an encoded document encoded using the method according to the present embodiment.

When the processing is started (step S401), firstly the encoding table included in the encoded document is analyzed and stored in the internal memory (step S402). Next, a DOM tree is generated based on the schema of the content model that appears repeatedly included in the encoding table, and the generated DOM tree is saved to the internal memory (step S403). That is, a DOM tree is generated based on the document structure shown by the encoding table, and the generated DOM tree is stored in a memory apparatus. Next, the encoded document is analyzed and decoded from the start thereof using the encoding table.

Next, it is determined whether the entire encoded document has been analyzed (step S404), and if it is determined that the entire encoded document has not been analyzed (NO in step S404), it is then determined whether the code being analyzed is the start code of the content model that appears repeatedly (step S405). If it is determined that the entire encoded document has been analyzed (YES in step S404), the decoding process ends (step S410).

If it is determined in step S405 that the code being analyzed is not the start code of the content model that appears repeatedly (NO in step S405), the processing proceeds to step S407. In step S407, it is determined whether the code being analyzed is the end code of the content model that appears repeatedly, and if it is not the end code (NO in step S407), the processing proceeds to step S408. In step S408, processing is performed to allocate a value to a node of the DOM. In steps S407 and S408, values referred to by the codes are thereby allocated in order to the nodes of the attribute values and element content in the DOM of the content model and stored in the internal memory, until the end code appears.

If it is determined in step S407 that the end code has appeared (YES in step S407), the processing proceeds to step S409. In step S409, XML data is generated based on the DOM tree stored in the internal memory in steps S407 to S408. XML data is generated by moving from the root node through the child nodes of the tree in order and analyzing the element names, attribute names, element content and attribute values. The generated XML data is stored in the internal memory, and the processing returns to step S404.

Note that if it is determined in step S405 that the code being analyzed is the start code of the content model that appears repeatedly (YES in step S405), decoding is performed in step S406 by referring to the vocabulary of the encoding table using that code. The processing then returns to step S404.

If it is determined in step S404 that the entire encoded document has been analyzed (YES in step S404), processing ends.

With the configuration according to the present embodiment, as described above, if XML data of the same content model appears repeatedly in a structured document in text format, the actual document structure of the content model is encoded using a schema. Attribute values and element content included in the content model are then added after the code of the content model. This enables the data size of XML data after encoding to be reduced.

Additional Embodiments

Although the embodiments of the present invention have been detailed above, the invention can, for example, be embodied as a system, apparatus, method, program or storage medium. Specifically, the invention may be applied to a system constituted by a plurality of devices, or to an apparatus composed of a single device.

Note that the invention is also achieved by directly or indirectly supplying a program that realizes the functions of the foregoing embodiments to a system or apparatus, and reading out and executing the supplied program code with a computer of the system or apparatus.

Consequently, the technical scope of the invention also covers the actual program code installed on the computer, in order to realize the functional processing of the invention by computer. That is, the invention also covers the actual computer program for realizing the functional processing of the invention.

In this case, provided the system or apparatus has the functions of the program, the program may be executed in any form, such as an object code, a program executed by an interpreter, or script data supplied to an operating system.

Storage media for supplying the program include, for example, floppy (registered trademark) disk, hard disk, optical disk, magneto-optical disk, CD-ROM, CD-R, CD-RW, magnetic tape, nonvolatile memory card, ROM, and DVD (DVD-ROM, DVD-R).

Alternatively, it is conceivable to supply the program by connecting to a website on the Internet using the browser of a client apparatus, and downloading the computer program according to the invention or a compressed file including an auto-install function from the website to a recording medium such as a hard disk. Further, the program can be supplied by dividing the program code constituting the program according to the invention into a plurality of files and downloading the respective files from different websites. That is, a World Wide Web (WWW) server that allows a plurality of users to download program files for realizing the functional processing of the invention by computer is also covered by the invention.

The following supply mode is also conceivable. That is, the program according to the invention is firstly encrypted, stored on a storage medium such as a CD-ROM and distributed to users. Then, users that meet prescribed requirements are allowed to download decryption key information from a website via the Internet, and the program decrypted using this key information is executed and installed on a computer to realize a configuration according to the invention. Such a supply mode is possible.

Apart from the functions of the foregoing embodiments being realized by a computer executing the read program, the following modes of realizing these functions are also envisioned. That is, an operating system or the like running on a computer performs part or all of the actual processing based on instructions in the program, with the functions of the foregoing embodiments being realizable as a result of this processing.

Further, the program read out from the storage medium may also be written to a memory provided in a function expansion board inserted in a computer or a function expansion unit connected to a computer, with the functions of the foregoing embodiments being realized based on instructions in the program. That is, a CPU or the like provided in the function expansion board or the function expansion unit performs part or all of the actual processing, with the functions of the foregoing embodiments being realized as a result of this processing.

The present invention enables a technique to be provided that makes it possible encode a structured document at an even smaller data size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-036808, filed Feb. 16, 2007, which is hereby incorporated by reference herein in its entirety.

The invention claimed is:

1. An information processing apparatus for encoding a structured document into an encoded document, comprising:
at least one processor operable to function as:
a storage unit that stores, into an encoding table, a portion of a schema describing an object included in the structured document as a vocabulary together with a first code, the portion of the schema defining at least a plurality of data types for a plurality of variables;
a verification unit that compares a grammar of a part of the structured document to a grammar of the portion of the schema in the encoding table and verifies that the grammar of the part of the structured document matches the grammar of the portion of the schema in the encoding table; and
an encoding unit that encodes the structured document by assigning the first code for the part of the structured document and by assigning a second code for a plurality of variables associated with the part of the structured document according to the plurality of data types.

2. The information processing apparatus according to claim 1, wherein the schema is written based on at least one of: a DTD, an XML Schema, and a RELAX NG.

3. A decoding apparatus that generates a structured document by decoding an encoded document encoded by an information processing apparatus as claimed in claim 1, the apparatus comprising:
at least one processor operable to function as:
a readout unit that reads an encoding table including (i) a portion of a schema describing an object included in the structured document as a vocabulary together with, the portion of the schema defining at least a plurality of data types for a plurality of variables and (ii) a variable together with a second code; and
a decoding unit that analyzes and decodes the encoded document including the first code and the second code by decoding the first code to a part of the structured document, and by decoding the second code to a variable according to a data type defined by the portion of the schema.

4. A non-transitory computer-readable storage medium storing a computer program which, when executed by a computer, causes the computer to function as an information processing apparatus as claimed in claim 1.

5. The information processing apparatus according to claim 1, wherein the storage unit specifies a predetermined element to store, into the encoding table, the portion of the schema describing the object included in the structured document as the vocabulary.

6. The information processing apparatus according to claim 1, wherein the storage unit adds, into the encoding table, the second code for the plurality of variables associated with the part of the structured document.

7. The information processing apparatus according to claim 1, wherein the storage unit determines whether the grammar of the portion of the schema appears repeatedly in the structured document, and wherein the storage unit stores, into the encoding table, the portion of the schema describing the object included in the structured document as the vocabulary together with the first code, if the storage unit determines that the portion of the schema appears repeatedly in the structured document.

8. The information processing apparatus according to claim 1, wherein the verification unit generates a Document Object Model (DOM) tree that includes a plurality of nodes, and wherein the verification unit verifies, based on the nodes of the DOM tree, whether the grammar of the part of the structured document matches the grammar of the portion of the schema in the encoding table.

9. The information processing apparatus according to claim 1, wherein the encoding unit encodes the structured document (i) by assigning the first code for the part of the structured document, (ii) by assigning the second code for the variables associated with the part of the structured document, (iii) by assigning a third code for a start of the part of the structured document, and (iv) by assigning a forth code for an end of the part of the structured document.

10. A control method of an information processing apparatus for encoding a structured document into an encoded document, the method comprising:
storing, into an encoding table, a portion of a schema describing an object included in the structured document as a vocabulary together with a first code, the portion of the schema defining at least a plurality of data types for a plurality of variables;
a verification unit verifying whether a grammar of a part of the structured document matches a grammar of the portion of the schema in the encoding table; and
an encoding unit encoding the structured document by assigning the first code for the part of the structured document, and by assigning a second code for a plurality of variables associated with the part of the structured document according to the plurality of the data types defined by the schema.

11. A control method of a decoding apparatus that generates a structured document by decoding an encoded document encoded using a control method of an information processing apparatus as claimed in claim 10, the method comprising:
reading an encoding table including (i) a portion of a schema describing an object included in the structured document as a vocabulary together with a first code, the portion of the schema defining at least a plurality of data types for a plurality of variables and (ii) a variable together with a second code; and
decoding the encoded document including the first code and the second code by decoding the first code to a part of the structured document, and by decoding a second code for a plurality of variables associated with the part of the structured document according to the plurality of the data types defined by the schema.

* * * * *